(12) United States Patent
Shohara et al.

(10) Patent No.: US 11,331,744 B2
(45) Date of Patent: May 17, 2022

(54) ELECTRIC WIRE ARRANGING JIG AND ULTRASONIC BONDING APPARATUS

(71) Applicant: YAZAKI CORPORATION, Tokyo (JP)

(72) Inventors: Kazuhiro Shohara, Makinohara (JP); Shinji Goto, Makinohara (JP); Kenta Tanaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 306 days.

(21) Appl. No.: 16/520,592

(22) Filed: Jul. 24, 2019

(65) Prior Publication Data

US 2019/0344378 A1 Nov. 14, 2019

Related U.S. Application Data

(63) Continuation of application No. PCT/JP2018/007365, filed on Feb. 27, 2018.

(30) Foreign Application Priority Data

Feb. 27, 2017 (JP) .............................. JP2017-034638

(51) Int. Cl.
*B23K 20/10* (2006.01)
*H01R 43/02* (2006.01)
(Continued)

(52) U.S. Cl.
CPC ............ *B23K 20/10* (2013.01); *B23K 20/004* (2013.01); *H01R 43/0207* (2013.01);
(Continued)

(58) Field of Classification Search
None
See application file for complete search history.

(56) References Cited

U.S. PATENT DOCUMENTS 3,067,489 A * 12/1962 Hoffman .................. H01R 4/20
29/862
3,146,519 A * 9/1964 Redwine .............. H01R 43/058
29/862
(Continued)

FOREIGN PATENT DOCUMENTS

CN 104218424 A 12/2014
CN 205159979 U 4/2016
(Continued)

OTHER PUBLICATIONS

Office Action dated Jun. 4, 2019 by the Japanese Patent Office in counterpart Japanese Patent Application No. 2017-034638.
(Continued)

*Primary Examiner* — Devang R Patel
(74) *Attorney, Agent, or Firm* — Sughrue Mion, PLLC

(57) ABSTRACT

An electric wire arranging jig (40) has an electric wire arranging groove (16, 31, 41) configured to be inserted the electric wires. The electric wire arranging groove has a pair of arranging surfaces facing each other. The electric wire arranging groove is configured to have a cross-sectional shape, in a section perpendicular to a direction of the electric wires extending within the electric wire arranging groove, having a distance in a width direction of the electric wire arranging groove continuously narrowed from an insertion start portion for the electric wires toward a bottom portion of the electric wire arranging groove and the arranging surfaces each inclining from a vertical direction, at least in a part of a segment between the insertion start portion and the bottom portion.

1 Claim, 8 Drawing Sheets

(51) Int. Cl.
*B23K 20/00* (2006.01)
*H01R 43/055* (2006.01)
*B23K 101/32* (2006.01)
*B23K 101/38* (2006.01)

(52) U.S. Cl.
CPC ........ *H01R 43/055* (2013.01); *B23K 2101/32* (2018.08); *B23K 2101/38* (2018.08)

(56) References Cited

U.S. PATENT DOCUMENTS

| | | | | |
|---|---|---|---|---|
| 4,890,384 A | * | 1/1990 | Shaffer | H01R 43/058 29/863 |
| 5,692,294 A | * | 12/1997 | Casey | B25B 27/146 29/751 |
| 6,089,438 A | * | 7/2000 | Suzuki | B23K 20/10 228/1.1 |
| 2011/0062218 A1 | * | 3/2011 | Ohnuma | B23K 20/106 228/110.1 |
| 2014/0311798 A1 | * | 10/2014 | Numata | H01R 4/187 174/75 R |
| 2014/0353361 A1 | | 12/2014 | Numata et al. | |

FOREIGN PATENT DOCUMENTS

| | | | |
|---|---|---|---|
| JP | 2005319483 A | * | 11/2005 |
| JP | 2006-15354 A | | 1/2006 |
| JP | 2007-134307 A | | 5/2007 |
| JP | 4391312 B2 | | 12/2009 |

OTHER PUBLICATIONS

International Search Report (PCT/ISA/210) dated May 1, 2018 by the International Searching Authority in counterpart International Patent Application No. PCT/JP2018/007365.

Written Opinion (PCT/ISA/237) dated May 1, 2018 by the International Searching Authority in counterpart International Patent Application No. PCT/JP2018/007365.

* cited by examiner

ELECTRIC WIRE ARRANGING JIG AND ULTRASONIC BONDING APPARATUS

CROSS-REFERENCE TO RELATED APPLICATIONS

This is a continuation of International Application No. PCT/JP2018/007365 filed on Feb. 27, 2018, and claims priority from Japanese Patent Application No. 2017-034638 filed on Feb. 27, 2017, the entire content of which is incorporated herein by reference.

BACKGROUND

Field of the Invention

The present invention relates to an electric wire arranging jig for arranging a plurality of electric wires when conductors of the electric wires are ultrasonically bonded to one another, and an ultrasonic bonding apparatus provided with the electric wire arranging jig.

Description of Related Art

In the background art, for example, a technique disclosed in Patent Literature 1 is known as a technique of ultrasonic bonding (also called ultrasonic welding) in which ultrasonic vibration is applied to respective conductors belonging to a plurality of electric wires so as to bond the conductors to one another.

As shown in FIG. 7 of Patent Literature 1, respective conductors 110 belonging to a plurality of electric wires are disposed to be gathered between a chip 132 (also called a horn) and an anvil 134 by a pair of guide jigs 120. After that, the conductors 110 are retained by respective opposed faces of the chip 132 and the anvil 134, and ultrasonic vibration is applied to the conductors 110 while applying pressure thereto between the chip 132 and the anvil 134. Thus, the conductors 110 are bonded to one another.

As for details of the above protector, refer to JP JP-A-2006-15354.

SUMMARY

However, in the background art, there is no restriction on how to arrange a plurality of conductors between a horn and an anvil. Therefore, in ultrasonic bonding of respective conductors 306 belonging to a plurality of electric wires 205, it is likely that the conductors 306 may be arranged in parallel when the conductors 306 are arranged in two or more rows (four rows in FIG. 8) along the depth direction between a pair of guide jigs 203 and 204, as shown in FIG. 8 of the present application.

As shown in FIG. 8 of the present application, when ultrasonic vibration is applied to the conductors 306 while applying pressure thereto between a horn 201 and an anvil 202 in the state where the conductors 306 are arranged in parallel, the ultrasonic vibration travels in the depth direction (directions indicated by a plurality of arrows illustrated in FIG. 8) between the guide jigs 203 and 204. As a result, the ultrasonic vibration hardly travels in the width direction between the guide jigs 203 and 204. There is a fear that energy derived from the ultrasonic vibration in the width direction cannot be sufficiently applied to the conductors 306.

When the energy derived from the ultrasonic vibration in the width direction between the guide jigs 203 and 204 is not sufficiently applied to the conductors 306 as described above, oxide films in the surfaces to be bonded in adjacent ones of the conductors 306 in the width direction cannot be broken easily. Thus, there is a fear that the metal surfaces cannot be cleaned sufficiently. As a result, in the surfaces to be bonded in the conductors 306 adjacent to each other in the width direction, activated metal atoms exposed by the removal of the oxide films hardly come in contact with one another. Thus, there is a fear that excellent bonding strength cannot be obtained.

An object of the present invention is to provide an electric wire arranging jig capable of obtaining excellent bonding strength in ultrasonic bonding of conductors to one another, and an ultrasonic bonding apparatus provided with the electric wire arranging jig.

Embodiments of an "electric wire arranging jig" according to the present invention provide the following item (1) and (2).

(1) An electric wire arranging jig arranging a plurality of electric wires upon conductors of the electric wires being ultrasonically bonded to one another, the electric wire arranging jig comprising an electric wire arranging groove configured to be inserted the electric wires, the electric wire arranging groove having a pair of arranging surfaces facing each other, the electric wire arranging groove being configured to have a cross-sectional shape, in a section perpendicular to a direction of the electric wires extending within the electric wire arranging groove, having a distance in a width direction of the electric wire arranging groove continuously narrowed from an insertion start portion for the electric wires toward a bottom portion of the electric wire arranging groove and the arranging surfaces each inclining from a vertical direction, at least in a part of a segment between the insertion start portion and the bottom portion.

According to the electric wire arranging jig of the aforementioned item (1), when the electric wires are inserted into the electric wire arranging groove, the electric wires are disposed so that any pair of the electric wires adjacent to each other in a depth direction of the electric wire arranging groove are displaced from each other in the width direction of the electric wire arranging groove due to the sectional shape of the electric wire arranging groove. Accordingly, differently from those in the aforementioned background art, the electric wires are arranged inside the electric wire arranging groove so as to be piled up in the depth direction of the electric wire arranging groove while central axes of the electric wires are offset in the width direction of the electric wire arranging groove, for example, as shown in FIG. 4.

(2) The electric wire arranging jig according to the item (1), wherein the electric wire arranging groove is a V-shaped groove having a V-shape in the section, or a composite groove having a V-shaped groove having a V-shape in the section and a concave groove communicating with a bottom portion of the V-shaped groove, the concave groove has a concave shape in which a distance in the width direction in the section is fixed.

According to the electric wire arranging jig of the aforementioned item (2), a V-shaped groove or a composite groove having a V-shaped groove partially is used as the electric wire arranging groove. When the electric wires are inserted into the electric wire arranging groove shaped thus, the electric wires are guided by edge faces of the V-shaped groove, and arranged inside the electric wire arranging groove so as to be displaced from one another in the width direction of the electric wire arranging groove as described above.

Embodiments of an "ultrasonic bonding apparatus" according to the present invention provide the following item (3) and (4).
(3) An ultrasonic bonding apparatus comprising:
an ultrasonic bonding apparatus body applying ultrasonic vibration to conductors of a plurality of electric wires to bond the conductors with one another; and
the electric wire arranging jig according to the item (1) or (2).

According to the ultrasonic bonding apparatus of the aforementioned item (3), the ultrasonic bonding apparatus can be configured to have the electric wire arranging jig according to the aforementioned item (1) or (2).
(4) An ultrasonic bonding apparatus comprising:
an ultrasonic bonding apparatus body applying ultrasonic vibration to conductors of a plurality of electric wires to bond the conductors with one another; and
An electric wire arranging jig arranging a plurality of electric wires upon conductors of the electric wires being ultrasonically bonded to one another,
the electric wire arranging jig comprising an electric wire arranging groove configured to be inserted the electric wires,
the electric wire arranging groove being configured to have a cross-sectional shape, in a section perpendicular to a direction of the electric wires extending within the electric wire arranging groove, having a distance in a width direction of the electric wire arranging groove continuously narrowed from an insertion start portion for the electric wires toward a bottom portion of the electric wire arranging groove, at least in a part of a segment between the insertion start portion and the bottom portion,
the electric wire holding structure including: an electric wire holding portion having an electric wire insertion groove configured to be inserted the electric wires; and an electric wire pressing portion pressing the electric wires inserted into the electric wire insertion groove toward a bottom portion of the electric wire insertion groove.

According to the ultrasonic bonding apparatus of the item (4), the electric wires inserted into the electric wire insertion groove are pressed by the electric wire pressing portion so as to be held inside the electric wire insertion groove. In addition, each of the electric wires can be prevented from being easily displaced in a longitudinal direction thereof.

Advantageous Effects of Invention

According to the aforementioned item (1), the conductors of the electric wires can be prevented from being arranged in parallel inside the electric wire arranging groove as in the aforementioned background art. Description will be made below along an example in which the electric wires are arranged to be staggered as shown in FIG. 4. When ultrasonic vibration is applied to the conductors of the electric wires arranged thus, the ultrasonic vibration can be transmitted efficiently not only in the depth direction of the electric wire arranging groove but also in the width direction of the electric wire arranging groove, as compared with that in the aforementioned background art. As a result, ultrasonic energy can be applied to the conductors of the electric wires uniformly. Thus, oxide films in the surfaces to be bonded to each other in the conductors of the electric wires can be broken more easily than in the aforementioned background art. According to the present invention, therefore, the bonding strength is more excellent than in the aforementioned background art. Thus, excellent bonding strength can be obtained when the conductors are ultrasonically bonded to one another.

According to the aforementioned item (2), the following effect can be obtained in addition to the effect of the item (1). That is, since the electric wires inserted into the electric wire arranging groove are guided by the edge faces inside the groove having a V-shape, the electric wires can be easily arranged to be displaced and staggered from one another in the width direction of the electric wire arranging groove. As a result, the conductors of the electric wires can be more surely prevented from being arranged in parallel as in the aforementioned background art. Thus, excellent bonding strength can be obtained when the conductors are ultrasonically bonded to one another.

According to the aforementioned item (3), a similar effect to that of the item (1) or that of the item (2) can be obtained.

According to the aforementioned item (4), the following effect can be obtained in addition to the effect of the item (3). That is, since the electric wires held by the electric wire holding unit is prevented from being easily displaced in the direction (longitudinal direction) in which the electric wires extend inside the electric wire insertion groove, the conductors of the electric wires can be disposed in predetermined positions. Accordingly, ultrasonic vibration can be surely applied to the conductors when the conductors are ultrasonically bonded to one another. Thus, the conductors can be more surely ultrasonically bonded to one another.

DETAILED DESCRIPTION

Embodiments of an electric wire arranging jig and an ultrasonic bonding apparatus provided with the electric wire arranging jig according to the present invention will be described with reference to FIG. 1 to FIG. 5.

Embodiments

Figure 1:
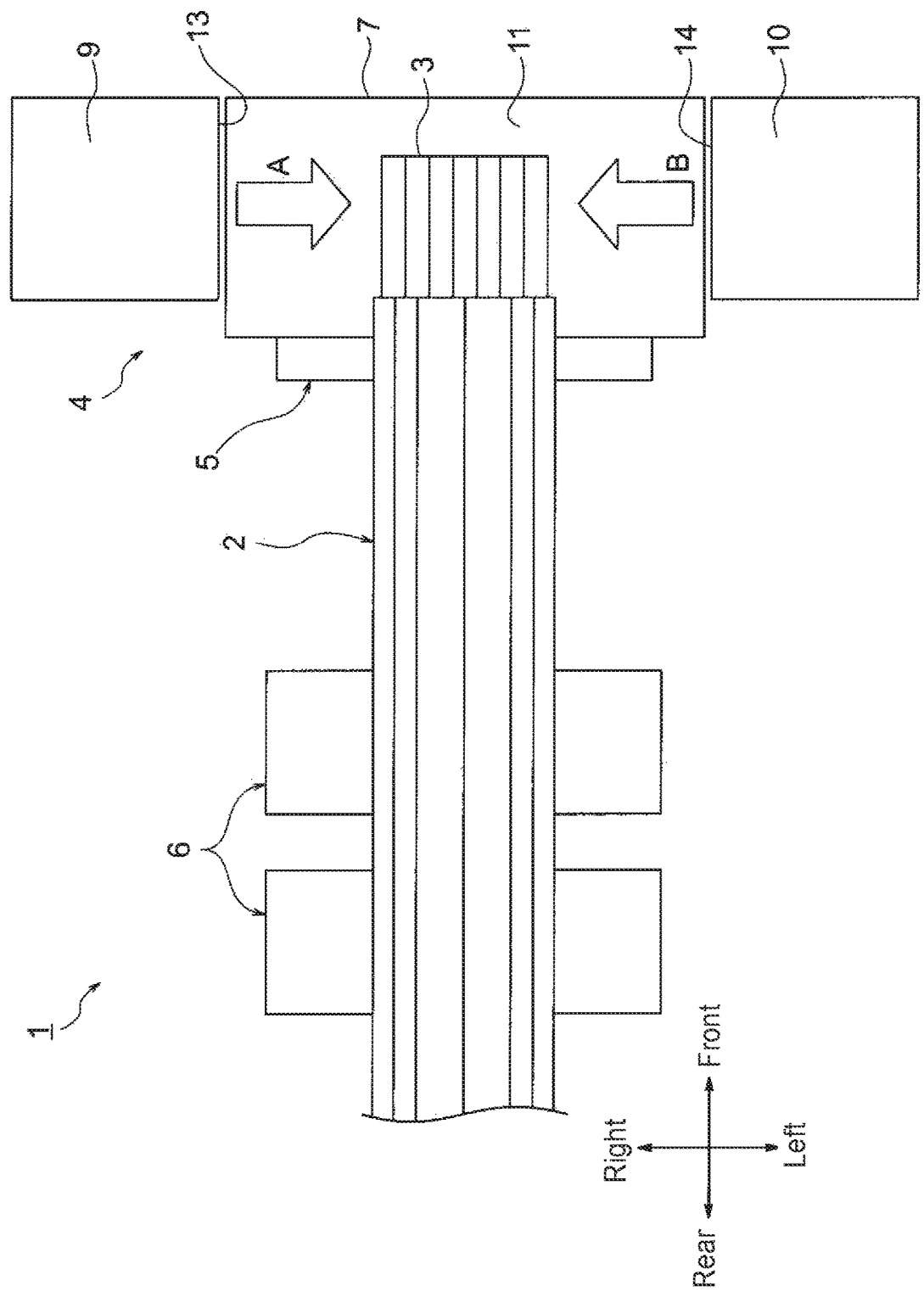
FIG. 1 is a plan view schematically showing an ultrasonic bonding apparatus provided with an electric wire arranging jig according to the present invention.
Figure 2:
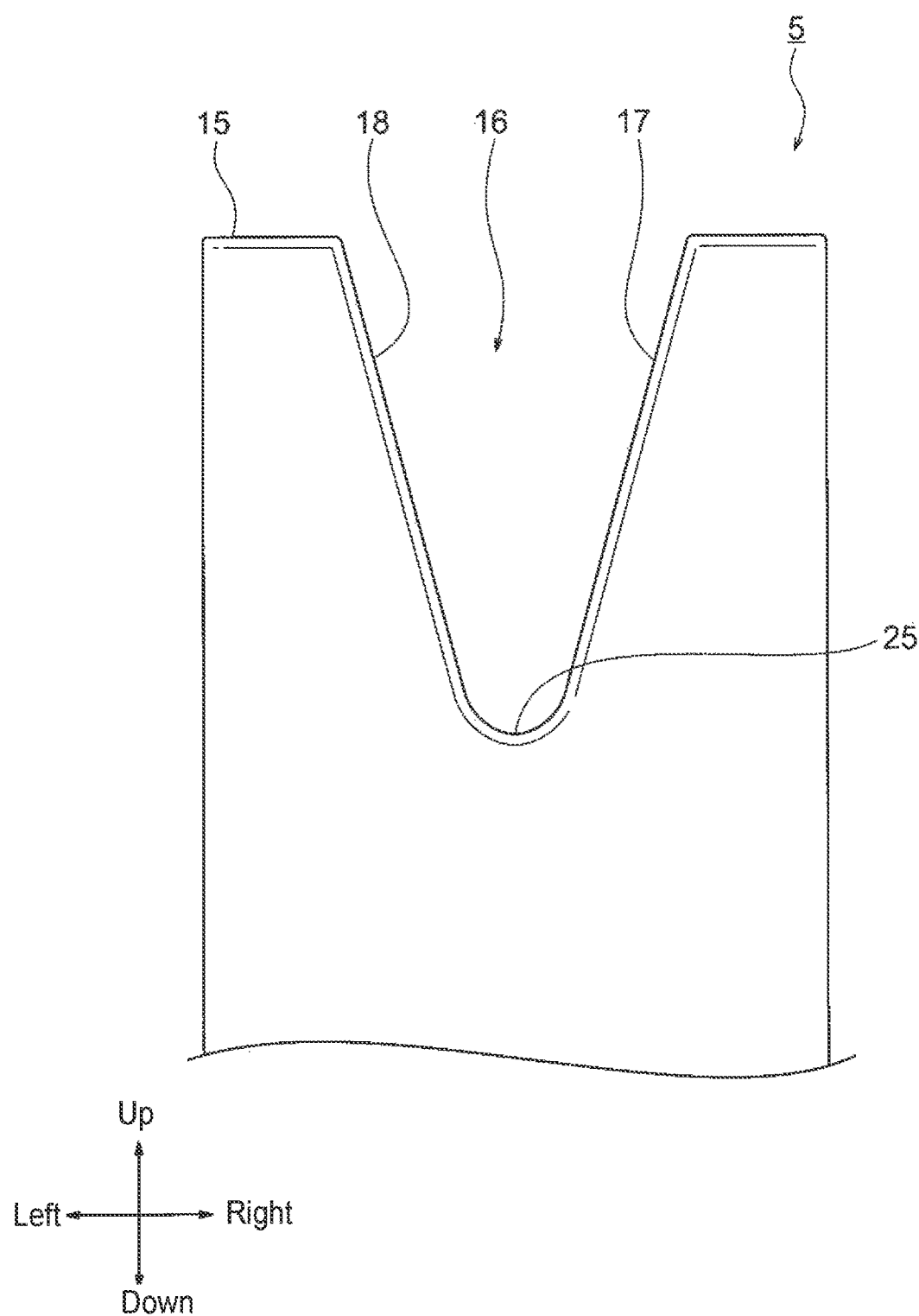
FIG. 2 is a front view on one end side of the electric wire arranging jig according to the present invention.
Figure 3:
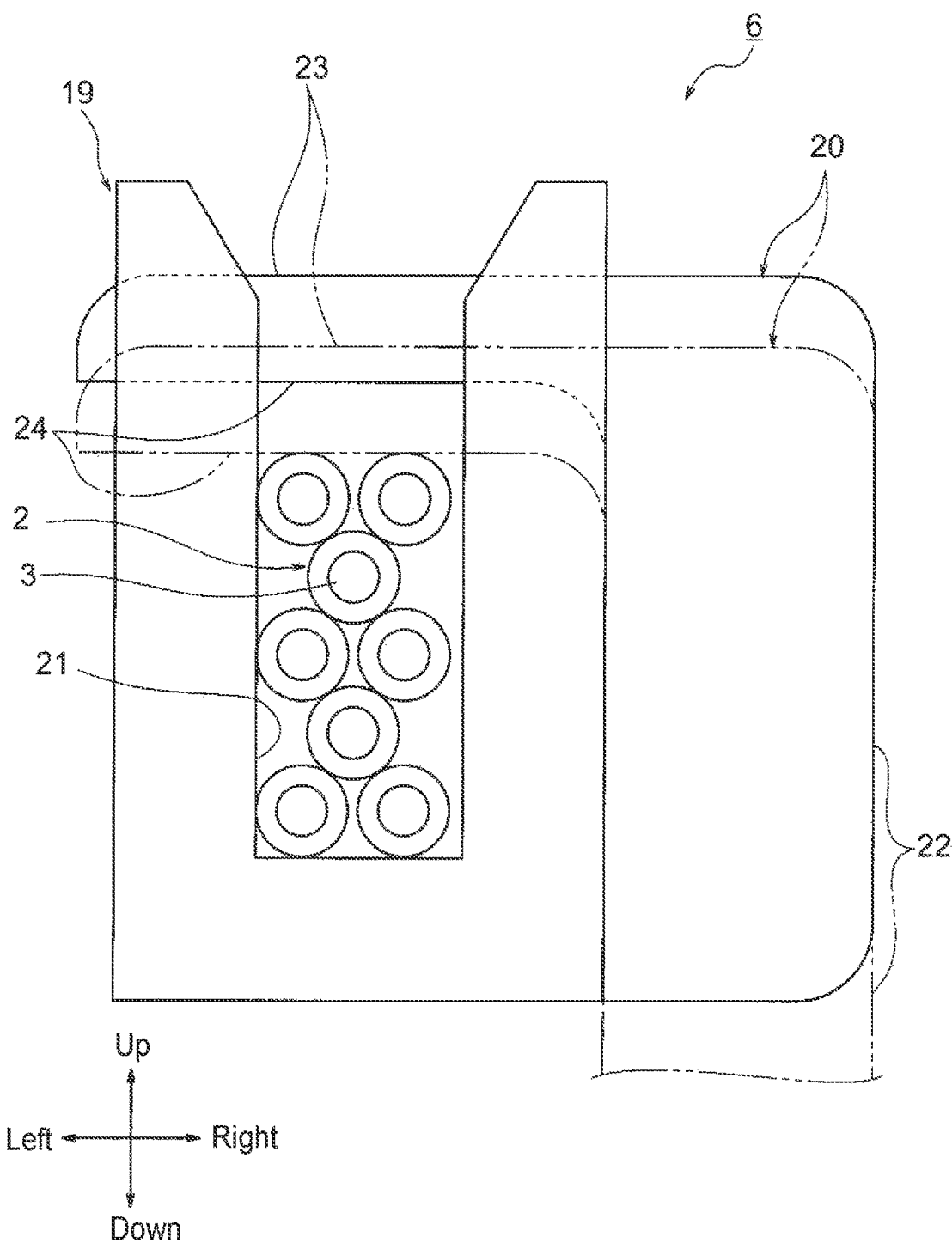
FIG. 3 is a view showing a state in which a plurality of electric wires have been held by an electric wire holding unit.
Figure 4:
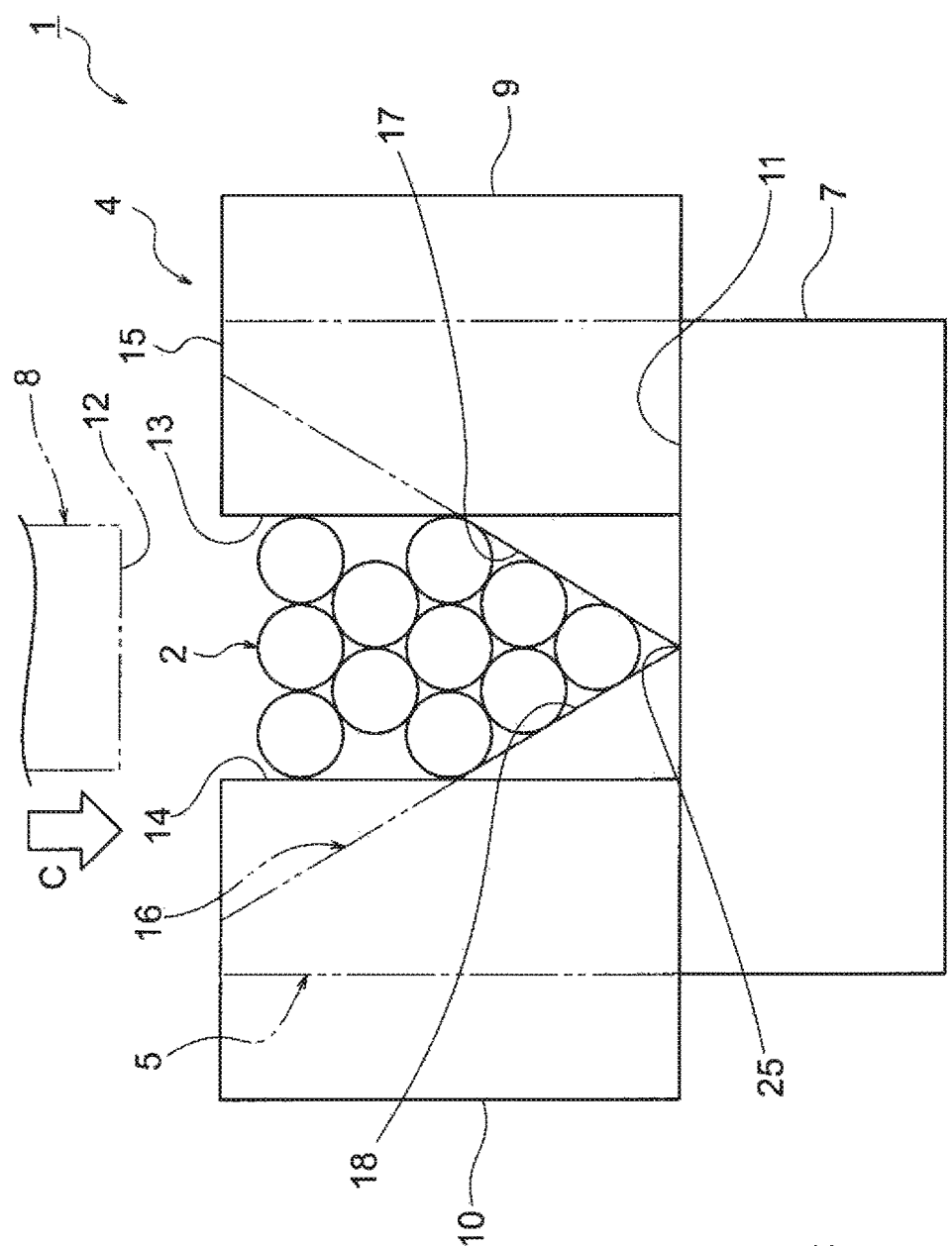
FIG. 4 is a view showing work of ultrasonically bonding conductors to one another.
Figure 4:
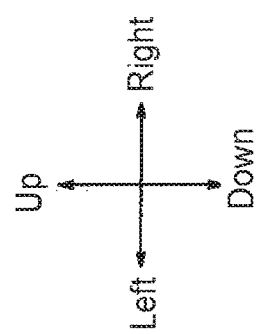
Figure 5:
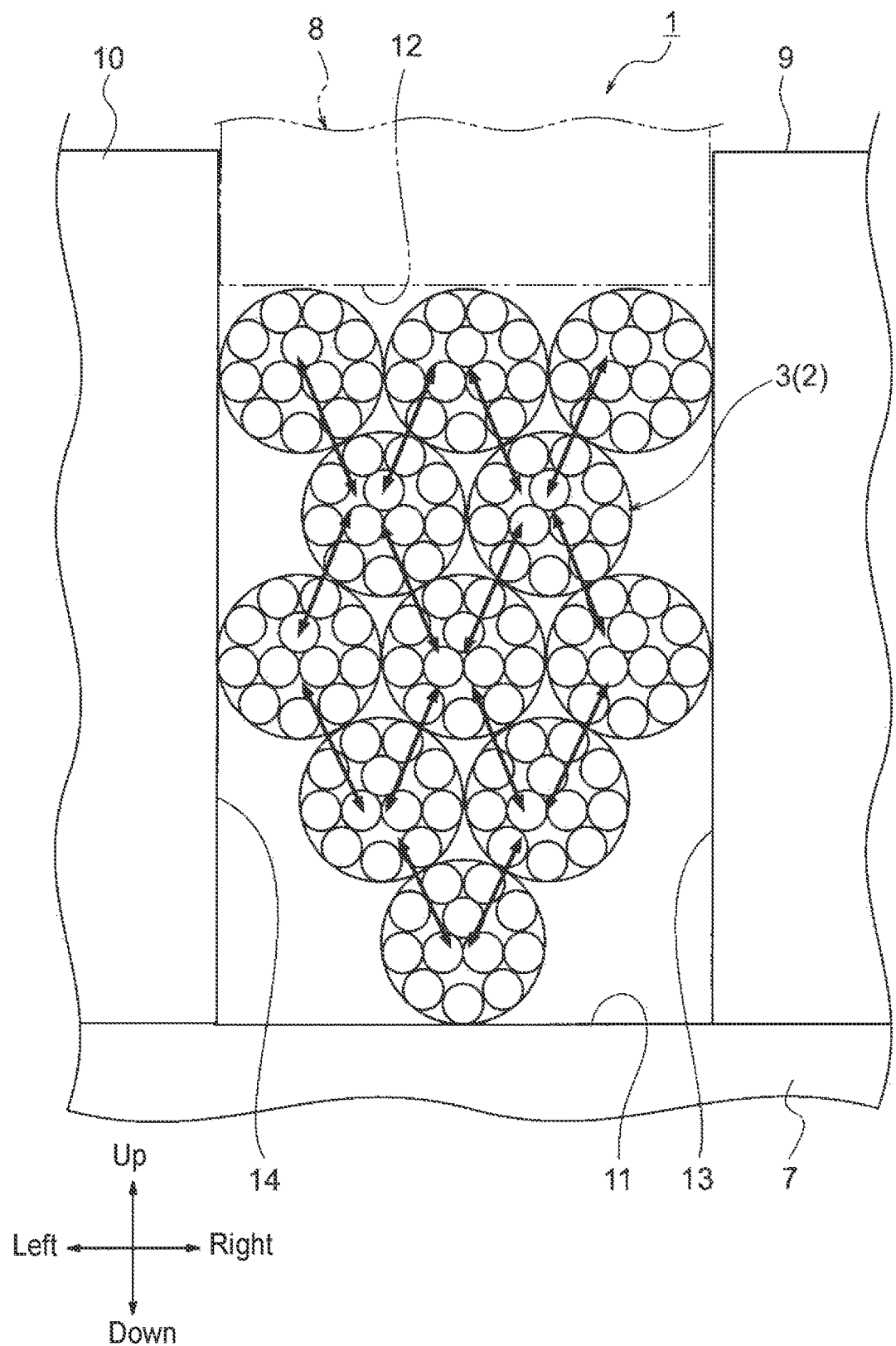
FIG. 5 is a view for explaining operation of the present invention when the conductors are ultrasonically bonding to one another.

FIG. 1 is a plan view schematically showing an ultrasonic bonding apparatus provided with an electric wire arranging jig according to the present invention. FIG. 2 is a front view on one end side of the electric wire arranging jig according to the present invention. FIG. 3 is a view showing a state in which a plurality of electric wires have been held by an electric wire holding unit. FIG. 4 is a view showing work of ultrasonically bonding conductors to one another. FIG. 5 is a view for explaining operation of the present invention when the conductors are ultrasonically bonding to one another.

Incidentally, arrows in the drawings indicate up, down, left, right, front and rear directions respectively (it is noted that the directions of the arrows are exemplary).

In FIG. 1, the reference numeral 1 represents an ultrasonic bonding apparatus provided with an electric wire arranging jig according to the present invention. The ultrasonic bonding apparatus 1 is also called an ultrasonic welding apparatus, which is an apparatus for ultrasonically bonding conductors 3 of a plurality of electric wires 2 to one another. The ultrasonic bonding apparatus 1 is configured to have an ultrasonic bonding apparatus body 4, an electric wire arranging jig 5, and electric wire holding units 6. The electric wire arranging jig 5 according to the present invention will be described while the respective constituents of the ultrasonic bonding apparatus 1 are explained.

First, the ultrasonic bonding apparatus body 4 will be described.

As shown in FIG. 1, the ultrasonic bonding apparatus body 4 is disposed on one end (front end in FIG. 1) side of the ultrasonic bonding apparatus 1, and configured to have a horn 7, an anvil 8 (see FIG. 4), and a pair of guide members 9 and 10.

The horn 7 and the anvil 8 are members which are disposed to be opposed to each other in the up/down direction as shown in FIG. 4 and FIG. 5 so as to hold the conductors 3 between the horn 7 and the anvil 8 and apply ultrasonic vibration to the conductors 3 while applying pressure thereto between the horn 7 and the anvil 8 in order to ultrasonically bond the conductors 3 to one another.

As shown in FIG. 4, the horn 7 has an opposed surface 11 which is opposed to the anvil 8. The horn 7 is fixedly provided with the opposed surface 11 upward. The horn 7 is configured so that vibration (ultrasonic vibration) of a not-shown ultrasonic vibrator can be transmitted.

Although the horn 7 is fixedly provided in this embodiment, the invention is not limited thereto. For example, the horn 7 may be configured so that the horn 7 can be moved to come close to and separate from the anvil 8, which will be described later, desirably by a not-shown driving mechanism.

As shown in FIG. 4, the anvil 8 has an opposed surface 12 which is opposed to the opposed surface 11 of the horn 7. The anvil 8 is disposed above the ultrasonic bonding apparatus body 4 with the opposed surface 12 downward (opposed to the opposed surface 11 of the horn 7). The anvil 8 is configured so that the anvil 8 can be moved to come close to and separate from the horn 7 (moved in the up/down direction in FIG. 4) desirably by a not-shown driving mechanism.

The pair of guide members 9 and 10 are members which are disposed to be opposed to each other in a direction (left-right direction in FIG. 1) perpendicular to the longitudinal direction of the electric wires 2 as shown in FIG. 1, so as to hold opposite side portions of the conductors 3 and guide the pressure applied to the conductor 3 between the horn 7 and the anvil 8. One guide member 9 has a guide face 13 opposed to the other guide member 10. The other guide member 10 has a guide face 14 opposed to the guide face 13 of the one guide member 9. The pair of guide members 9 and 10 are configured so that the guide members 9 and 10 can be moved to come close to and separate from each other, the guide member 9 can be moved in a direction indicated by the arrow A shown in FIG. 1, and the guide member 10 can be moved in a direction indicated by the arrow B shown in FIG. 1) desirably along the opposed surface 11 of the horn 7 by a not-shown driving mechanism.

Next, the electric wire arranging jig 5 according to the present invention will be described.

As shown in FIG. 1, the electric wire arranging jig 5 is a member which is disposed in a position close to the ultrasonic bonding apparatus body 4 (on the rear end side of the ultrasonic bonding apparatus body 4 in FIG. 1) so as to arrange the electric wires 2 when the conductors 3 are ultrasonically bonded to one another.

The electric wire arranging jig 5 is, for example, made of a metal plate-like member. Although not illustrated particularly, the electric wire arranging jig 5 is bent and formed into a predetermined shape. As shown in FIG. 2 and FIG. 4, the electric wire arranging jig 5 has, on one end 15 side thereof, an electric wire arranging groove 16 to which the electric wires 2 can be inserted.

In the electric wire arranging groove 16, as shown in FIG. 2 and FIG. 4, of edge faces inside the groove, a pair of edge faces opposed to each other are formed as electric wire guide edge faces 17 and 18 for guiding the electric wires 2. In addition, an edge face connecting the electric wire guide face 17 with the electric wire guide face 18 is formed as a bottom portion 25 of the electric wire arranging groove 16. The electric wire guide edge faces 17 and 18 are formed to be inclined from an insertion start portion where the electric wires 2 begin to be inserted (a portion on the one end 15 side of the electric wire arranging groove 16 in FIG. 2), toward the bottom portion 25 in a segment between the insertion start portion of the electric wires 2 and the bottom portion 25.

The "electric wire arranging groove" in the present invention is formed so that a distance in a width direction (left-right direction in FIG. 2) of the electric wire arranging groove 16 is continuously narrowed from the insertion start portion of the electric wires 2 toward the bottom portion 25 at least in a part of a segment between the insertion start portion of the electric wires 2 and the bottom portion 25 inside the groove. As shown in FIG. 2, the electric wire arranging groove 16 in this embodiment is formed so that the distance in the width direction of the electric wire arranging groove 16 is continuously narrowed from the insertion start portion of the electric wires 2 toward the bottom portion 25 in the segment between the insertion start portion of the electric wires 2 and the bottom portion 25. Thus, the electric wire arranging groove 16 in this embodiment is a V-shaped groove formed into a V-shape.

The sectional shape of the electric wire arranging groove 16 in this embodiment is formed so that when the electric wires 2 are inserted into the electric wire arranging groove 16, the electric wires 2 can be piled up in the depth direction of the electric wire arranging groove 16 while the central axes of the electric wires 2 are offset in the width direction (left-right direction in FIG. 4) of the electric wire arranging groove 16 as shown in FIG. 4 (to say other words, when the electric wires 2 are arranged in two or more rows in the width direction of the electric wire arranging groove 16, any pair of electric wires 2 belonging to two rows adjacent to each other can be disposed to be displaced from each other in the width direction of the electric wire arranging groove 16).

Incidentally, although the electric wire arranging groove 16 in this embodiment is a V-shaped groove formed into a V-shape, this configuration is exemplary. Otherwise, though not shown, the electric wire arranging groove 16 may be, for example, formed to have a V-shape in a part starting at the insertion start portion of the electric wires 2 and extending in the depth direction (up-down direction in FIG. 4) of the electric wire arranging groove 16, and to have, in the other part, a fixed distance in the width direction (left-right direction in FIG. 4). Alternatively, each modified example that will be described later may be used instead.

Next, the electric wire holding units 6 will be described.

As shown in FIG. 1, each of the electric wire holding units 6 is a member which is disposed in a position close to the ultrasonic bonding apparatus body 4 (at the rear of the electric wire arranging jig 5 in FIG. 1) so as to hold the electric wires 2 when the conductors 3 are ultrasonically bonded to one another. Although two electric wire holding units 6 are provided in this embodiment, the present invention is not limited thereto. More specifically, each of the electric wire holding units 6 is configured to have an electric wire holding portion 19 and an electric wire pressing portion 20 as shown in FIG. 3.

The electric wire holding portion 19 shown in FIG. 3 has an electric wire insertion groove 21 which is formed so that the electric wires 2 can be inserted thereto. The electric wire insertion groove 21 is formed into a concave portion in which a distance in the width direction (left-right direction in FIG. 3) of the electric wire insertion groove 21 is fixed.

As shown in FIG. 3, the electric wire insertion groove 21 is formed so that when the electric wires 2 are inserted, the electric wires 2 can be piled up in the depth direction of the electric wire arranging groove 16 while the central axes of the electric wires 2 are offset in the width direction of the electric wire arranging groove 16 (to say other words, when the electric wires 2 are arranged in two or more rows in the width direction of the electric wire insertion groove 21, any pair of electric wires 2 belonging to two rows adjacent to each other can be disposed to be displaced from each other in the width direction of the electric wire insertion groove 21). When the electric wires 2 are arranged thus inside the electric wire insertion groove 21, the electric wires 2 can be easily arranged to be staggered from one another inside the electric wire arranging groove 16 of the electric wire arranging jig 5 shown in FIG. 2.

Though not particularly shown in FIG. 1, the electric wire pressing portion 20 shown in FIG. 3 is a member which is disposed on the rear end side of the electric wire holding portion 19 so as to press the electric wires 2, which have been inserted into the electric wire insertion groove 21 of the electric wire holding portion 19, toward a bottom portion of the electric wire insertion groove 21. The electric wire pressing portion 20 is formed into an approximately L-shape, and configured to have an electric wire pressing portion body 22 and an electric wire pressing piece 23.

The electric wire pressing portion body 22 is configured so that the electric wire pressing portion body 22 can move in the up-down direction along the longitudinal direction of the electric wire holding portion 19 as shown by the imaginary line in FIG. 3.

The electric wire pressing piece 23 is provided to protrude perpendicularly to the longitudinal direction of the electric wire pressing portion body 22 from one end side of the electric wire pressing portion body 22 as shown in FIG. 3. The electric wire pressing piece 23 has an electric wire pressing face 24 opposed to the electric wires 2 inserted into the electric wire insertion groove 21.

The electric wire pressing piece 23 is configured so that the height position of the electric wire pressing face 24 within the electric wire insertion groove 21 can be adjusted through the up-down movement of the electric wire pressing portion body 22. Accordingly, the electric wire pressing piece 23 can adjust the height position of the electric wire pressing face 24 in accordance with the number of electric wires 2 inserted into the electric wire insertion groove 21. In FIG. 3, when the electric wire pressing portion 20 moves downward, the electric wire pressing face 24 of the electric wire pressing piece 23 illustrated by the imaginary line comes into contact with the electric wires 2 and presses the electric wires. Thus, the electric wires 2 can be prevented from being easily displaced in the longitudinal direction thereof.

Next, description will be made about work in which the conductors 3 are ultrasonically bonded to one another by the ultrasonic bonding apparatus 1.

First, as shown in FIG. 1, the electric wires 2 are held by the electric wire holding units 6 as described previously (see FIG. 3). Then, as shown in FIG. 1 and FIG. 4, the electric wires 2 are inserted into the electric wire arranging groove 16 of the electric wire arranging jig 5 so that the conductors 3 are disposed between the horn 7 and the anvil 8.

After that, in FIG. 1, the guide members 9 and 10 are moved in directions in which the guide members 9 and 10 can approach each other along the opposed surface 11 of the horn 7 (the guide member 9 is moved in the direction indicated by the arrow A shown in FIG. 1, and the guide member 10 is moved in the direction indicated by the arrow B shown in FIG. 1). Thus, a predetermined distance is formed so that the conductors 3 can be disposed therein.

As a result, the electric wires 2 inserted into the electric wire arranging groove 16 of the electric wire arranging jig 5 are guided by the electric wire guide edge faces 17 and 18 of the electric wire arranging groove 16 while the conductors of the electric wires 2 are guided by the guide faces 13 and 14 of the guide members 9 and 10. Thus, the electric wires 2 are arranged to be staggered as shown in FIG. 4.

After that, as shown in FIG. 4, the anvil 8 is moved in a direction indicated by the arrow C (downward in FIG. 4). Then, as shown in FIG. 5, the conductors 3 are held by the horn 7 and the anvil 8, and ultrasonic vibration transmitted from an ultrasonic vibrator is applied to the conductors 3 to thereby bond the conductors 3 to one another while applying pressure thereto between the horn 7 and the anvil 8. In this manner, the work of ultrasonically bonding the conductors 3 to one another is completed.

Next, operation in the case where the electric wire arranging jig 5 according to the present invention is used will be described.

As shown in FIG. 5, when ultrasonic vibration is applied to each of the conductors 3 of the electric wires 2 arranged to be staggered, the ultrasonic vibration is transmitted from the conductor 3 to the conductors 3 of the electric wires 2 disposed in adjacent ones of the rows of the electric wires 2 in the width direction of the electric wire arranging groove 16 and displaced in the width direction as indicated by arrows shown in FIG. 5. In this manner, ultrasonic energy can be applied to the conductors 3 of the electric wires 2 uniformly. Thus, oxide films in the surfaces to be bonded to each other in the conductors 3 of the electric wires 2 belonging to adjacent ones of the rows of the electric wires 2 in the width direction can be broken so that the conductors 3 can be bonded to each other.

Figure 7:
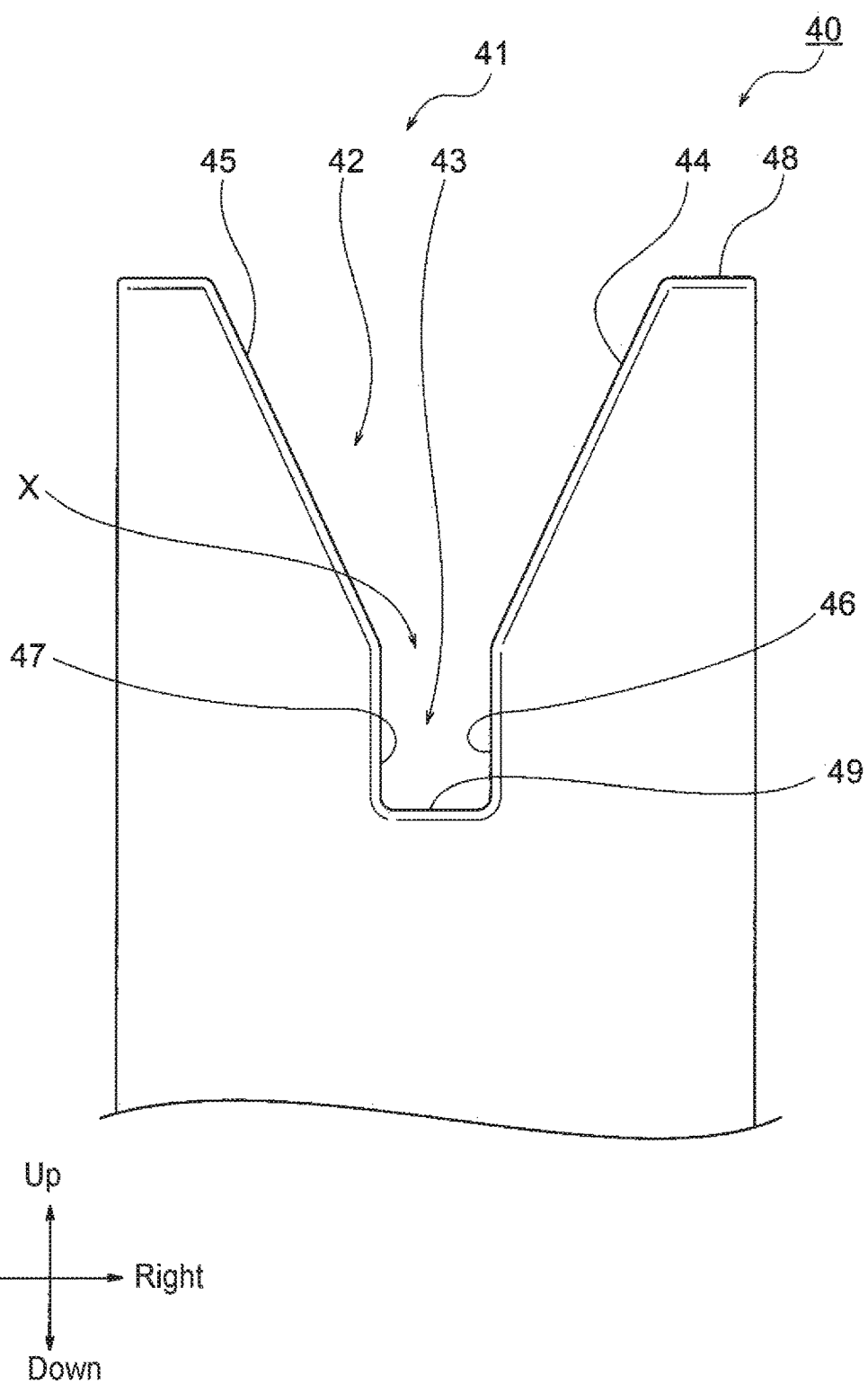
FIG. 7 is a view showing Modification 2 of an electric wire arranging jig according to the present invention.

When the conductors 3 of the electric wires 2 belonging to adjacent ones of the rows of the electric wires 2 in the width direction of the electric wire arranging groove 16 are bonded to each other as in the present invention, bonding strength is more excellent than in a case where ultrasonic vibration is applied to the conductors 306 of the electric wires 205 arranged as shown in FIG. 7 are bonded to each other.

In addition, when the oxide films in the surfaces to be bonded to each other in the conductors 3 of the electric wires 2 belonging to adjacent ones of the rows of the electric wires 2 in the width direction of the electric wire arranging groove 16 are broken as in the present invention, the oxide films can be removed surely even if the electric wires 2 have the oxide films firmly provided on the surfaces of the conductors as aluminum electric wires.

Figure 6:
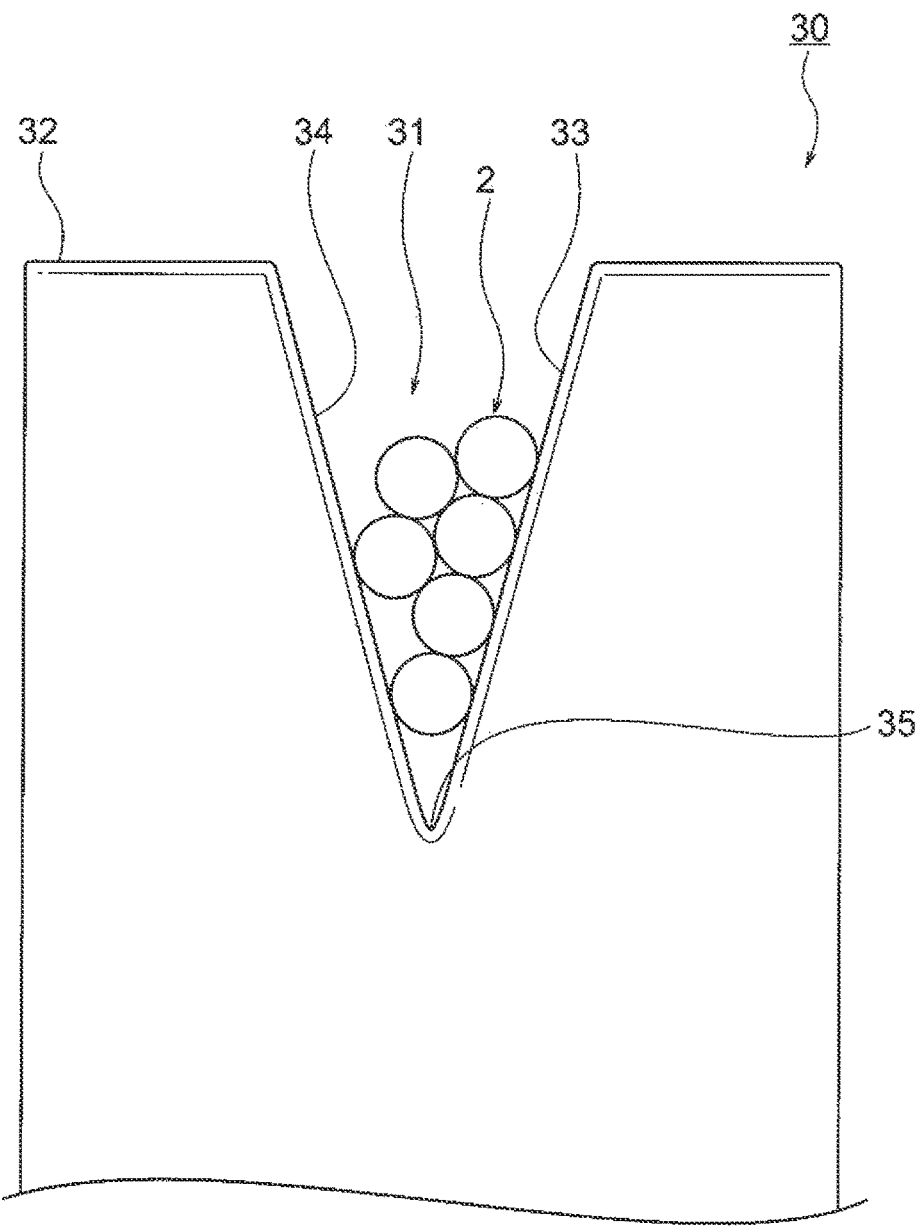
FIG. 6 is a view showing Modification 1 of an electric wire arranging jig according to the present invention.
Figure 6:
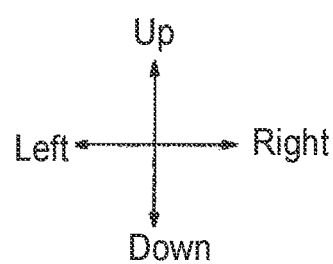

The electric wire arranging jig 5 configured thus according to the present invention may be replaced by Modification 1 shown in FIG. 6 or Modification 2 shown in FIG. 7. Modifications 1 and 2 will be described below.

Modification 1:

In an electric wire arranging jig 30 according to Modification 1 shown in FIG. 6, an electric wire arranging groove 31 is formed so that a distance in the width direction (left-right direction in FIG. 6) of the insertion start portion (on one end 32 side of the electric wire arranging jig 30 in FIG. 6) of the electric wires 2 is narrower than in the electric wire arranging groove 16 (see FIG. 2) of the electric wire arranging jig 5 according to the embodiment.

The electric wire arranging groove 31 is formed so that electric wire guide edge faces 33 and 34 are inclined from the insertion start portion of the electric wires 2 toward a bottom portion 35 of the electric wire arranging groove 31 in a segment between the insertion start portion of the electric wires 2 and the bottom portion 35. The electric wire arranging groove 31 is a V-shaped groove formed into a V-shape with a sharper angle than in the electric wire arranging groove 16 (see FIG. 2) of the electric wire arranging jig 5 according to the embodiment.

As shown in FIG. 6, when the electric wires 2 are inserted into the electric wire arranging groove 31, the electric wires 2 are disposed so that the electric wires 2 adjacent to each other in the depth direction of the electric wire arranging groove 31 (the insertion direction of the electric wires 2, or the up-down direction in FIG. 6) are displaced from each other in the width direction (left-right direction in FIG. 6) of the electric wire arranging groove 31.

Incidentally, although the electric wire arranging groove 31 in this embodiment is a V-shaped groove formed into a V-shape, this configuration is exemplary. Otherwise, though not shown, the electric wire arranging groove 31 may be, for example, formed to have a V-shape in a part starting at the insertion start portion of the electric wires 2 and extending in the depth direction of the electric wire arranging groove 31, and to have, in the other part, a fixed distance in the width direction.

Modification 2:

In an electric wire arranging jig 40 according to Modification 2 shown in FIG. 7, an electric wire arranging groove 41 is configured as a composite groove having a V-shaped groove 42 and a concave groove 43.

The V-shaped groove 42 is formed into a V-shape so that a pair of edge faces of the V-shaped groove 42 opposed to each other are formed as electric wire guide edge faces 44 and 45 for guiding the electric wires 2 (see FIG. 1). The electric wire guide edge faces 44 and 45 are formed to be inclined from the insertion start portion (on one end 48 side of the electric wire arranging groove 41 in FIG. 7) of the electric wires 2 toward a bottom portion 49 of the electric wire arranging groove 41, which will be described later, in a segment between the insertion start portion of the electric wires 2 and a bottom portion (in FIG. 7, corresponding to a communication position X where the V-shaped groove 42 communicates with the concave groove 43 which will be described layer) of the V-shaped groove 42.

As shown in FIG. 7, the concave groove 43 is formed into a concave shape which communicates with the bottom portion (communication position X) of the V-shaped groove 42 and has a fixed distance in the width direction (left-right direction in FIG. 7) of the groove, while a pair of edge faces opposed to each other in the concave groove 43 are formed as electric wire guide edge faces 46 and 47 for guiding the electric wires 2 (see FIG. 1). In addition, the edge face connecting the electric wire guide edge face 46 with the electric wire guide edge face 47 is formed as the bottom portion 49 of the electric wire arranging groove 41.

Incidentally, though not shown, the electric wire arranging groove 41 may be formed to have a V-shape in a part starting at the insertion start portion of the electric wires 2 in the V-shaped groove 42 and extending in the depth direction (up-down direction in FIG. 7) of the V-shaped groove 42, and to have, in the other part, a fixed distance in the width direction (left-right direction in FIG. 7). That is, the electric wire arranging groove 41 may be formed so that the distance in the width direction of the electric wire arranging groove 41 is continuously narrowed from the insertion start portion of the electric wires 2 toward the bottom portion 49 of the electric wire arranging groove 41 in a part of a segment between the insertion start portion of the electric wires 2 and the bottom portion 49 of the electric wire arranging groove 41.

The arrangement of the electric wires 2 within the electric wire arranging groove 41 is not particularly illustrated, but they may be, for example, arranged in the following manner.

That is, the electric wires 2 inserted into the concave groove 43 are arranged in the up-down direction, while the electric wires 2 inserted into the V-shaped groove 42 are arranged in a plurality of rows of the electric wires 2 in the width direction of the V-shaped groove 42. Thus, the electric wires 2 belonging to adjacent ones of the rows can be disposed to be displaced from each other in the width direction of the V-shaped groove 42 so that the electric wires 2 can be arranged to be staggered from each other. Then, each electric wire 2 inserted into the concave groove 43 and an electric wire 2 adjacent thereto in the V-shaped groove 42 are disposed to be displaced from each other in the width direction. Also near the communication position X where the V-shaped groove 42 communicates with the concave groove 43, the electric wires 2 are arranged to be staggered from each other (it is noted that this arrangement is exemplary).

Next, description will be made about the effects of the electric wire arranging jig 5, 30, 40 and the ultrasonic bonding apparatus 1 having the electric wire arranging jig 5, 30, 40.

Figure 8:
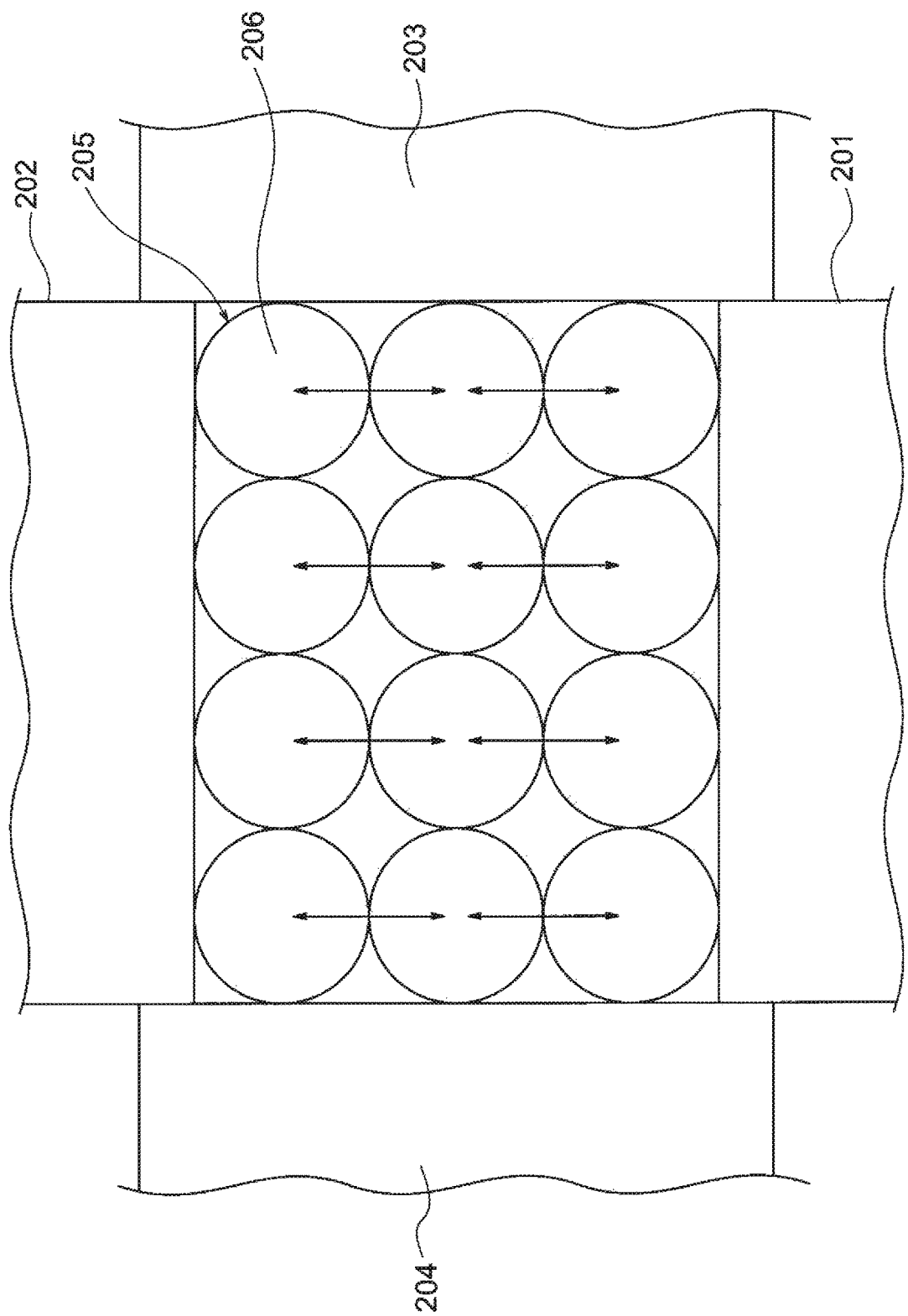
FIG. 8 is a view for explaining the background art.

According to the present invention, as has been described above with reference to FIG. 1 to FIG. 7, adjacent ones of the electric wires 2 in the depth direction of the electric wire arranging groove 16, 31, 41 are disposed inside the electric wire arranging groove 16, 31, 41 so as to be displaced from each other in the width direction of the electric wire arranging groove 16, 31, 41. Thus, the conductors 3 of the electric wires 2 can be prevented from being arranged as in the aforementioned background art. The following description will be made along an example in which the electric wires 2 are arranged to be staggered from one another by use of the electric wire arranging jig 5 as shown in FIG. 4 and so on. When ultrasonic vibration is applied to the conductors 3 of the electric wires 2 arranged thus, the ultrasonic vibration is transmitted from each of the conductors 3 to the conductors 3 of the electric wires 2 belonging to adjacent ones of the rows of the electric wires 2 in the width direction of the electric wire arranging groove 16 and disposed to be staggered in the width direction. As a result, ultrasonic energy can be applied to the conductors 3 of the electric wires 2 uniformly. Thus, oxide films in the surfaces to be bonded to each other in the conductors 3 of the electric wires 2 belonging to adjacent ones of the rows of the electric wires 2 in the width direction can be broken so that the conductors 3 can be bonded to each other. In this manner, according to the present invention, bonding strength is more excellent than in the case where the electric wires 205 are arranged as shown in FIG. 8. Accordingly, there is an effect that it is possible to obtain excellent bonding strength when the conductors 3 are ultrasonically bonded to one another.

In addition to the aforementioned effect, according to the present invention, the following effect can be obtained. That is, the electric wires 2 inserted into the electric wire arranging groove 16, 31, 41 are guided by the edge faces 17 and 18, 33 and 34, 44 and 45 in the groove formed into a V-shape, so that the electric wires 2 adjacent to each other in the depth direction of the electric wire arranging groove 16, 31, 41 can be easily arranged to be displaced from each other in the width direction of the electric wire arranging groove 16, 31, 41. As a result, in the example of the electric wire arranging jig 5, the electric wires 2 can be easily arranged to be staggered from one another inside the electric wire arranging groove 16. Thus, it is possible to more surely prevent the conductors 3 of the electric wires 2 from being arranged as in the aforementioned background art. Accordingly, there is an effect that it is possible to obtain more excellent bonding strength when the conductors 3 are ultrasonically bonded to one another.

In addition, in the ultrasonic bonding apparatus 1 having the electric wire arranging jig 5, 30, 40 according to the present invention, it is possible to obtain a similar effect to that of the electric wire arranging jig 5, 30, 40 having the aforementioned configuration.

Further, in addition to the aforementioned effect, in the ultrasonic bonding apparatus 1 having the electric wire arranging jig 5, 30, 40 according to the present invention, it is possible to obtain the following effect. That is, the electric wires 2 held by the electric wire holding units 6 are prevented from being easily displaced in the longitudinal direction thereof. Therefore, the conductors 3 of the electric wires 2 can be disposed in predetermined positions. Accordingly, ultrasonic vibration can be surely applied to the conductors 3 when the conductors 3 are ultrasonically bonded to one another. Thus, there is an effect that the conductors 3 can be more surely ultrasonically bonded to one another.

Although description has been made about a specific embodiment of the present invention, the invention is not limited to the appearance or configuration thereof. Various changes, additions, and deletions can be made without departing from the gist of the invention.

Here, the features of the aforementioned embodiments of the electric wire arranging jig 40 and the ultrasonic bonding apparatus 1 according to the present invention will be summarized and listed briefly in the following items (1) to (4).

(1) An electric wire arranging jig (40) arranging a plurality of electric wires (2) upon conductors (3) of the electric wires being ultrasonically bonded to one another,
the electric wire arranging jig comprising an electric wire arranging groove (16, 31, 41) configured to be inserted the electric wires,
the electric wire arranging groove being configured to have a cross-sectional shape, in a section perpendicular to a direction of the electric wires extending within the electric wire arranging groove, having a distance in a width direction of the electric wire arranging groove continuously narrowed from an insertion start portion for the electric wires toward a bottom portion (49) of the electric wire arranging groove, at least in a part of a segment between the insertion start portion and the bottom portion.

(2) The electric wire arranging jig according to the item (1), wherein
the electric wire arranging groove (16, 31, 41) is a V-shaped groove (42) having a V-shape in the section, or a composite groove having a V-shaped groove having a V-shape in the section and a concave groove (43) communicating with a bottom portion of the V-shaped groove, the concave groove has a concave shape in which a distance in the width direction in the section is fixed.

(3) An ultrasonic bonding apparatus (1) comprising:
an ultrasonic bonding apparatus body (4) applying ultrasonic vibration to conductors (3) of a plurality of electric wires (2) to bond the conductors with one another; and
the electric wire arranging jig (40) according to the item (1) or (2).

(4) The ultrasonic bonding apparatus (1) according to the item (3), the apparatus further comprising:
an electric wire holding structure (6) including: an electric wire holding portion (19) having an electric wire insertion groove configured to be inserted the electric wires; and an electric wire pressing portion (20) pressing the electric wires inserted into the electric wire insertion groove toward a bottom portion of the electric wire insertion groove.

According to an electric wire arranging jig and an ultrasonic bonding apparatus according to the present invention, it is possible to obtain excellent bonding strength when conductors are ultrasonically bonded to one another. The invention having this effect is useful for the electric wire arranging jig and the ultrasonic bonding apparatus.

REFERENCE SIGNS LIST

1 . . . ultrasonic bonding apparatus, 2 . . . electric wire, 3 . . . conductor, 4 . . . ultrasonic bonding apparatus body, 5,30,40 . . . electric wire arranging jig, 6 . . . electric wire holding unit, 7 . . . horn, 8 . . . anvil, 9,10 . . . guide member, 11,12 . . . opposed surface, 13.14 . . . guide face, 15,32, 48 . . . one end, 16,31,41 . . . electric wire arranging groove, 17,18,33,34,44-47 . . . electric wire guide edge face, 19 . . . electric wire holding portion, 20 . . . electric wire pressing portion, 21 . . . electric wire insertion groove, 22 . . . electric wire pressing portion body, 23 . . . electric wire pressing piece, 24 . . . electric wire pressing face, 25,35,49 . . . bottom portion, 42 . . . V-shaped groove, 43 . . . concave groove, X . . . communication position

The invention claimed is:

1. An ultrasonic bonding apparatus comprising:
an ultrasonic bonding apparatus body applying ultrasonic vibration to conductors of a plurality of electric wires to bond the conductors with one another; and
an electric wire arranging jig arranging a plurality of electric wires upon conductors of the electric wires being ultrasonically bonded to one another,
the electric wire arranging jig comprising an electric wire arranging groove configured to receive the electric wires inserted therein,
the electric wire arranging groove being configured to have a cross-sectional shape, in a section perpendicular to a direction of the electric wires extending within the electric wire arranging groove, having a distance in a width direction of the electric wire arranging groove continuously narrowed from an insertion start portion for the electric wires toward a bottom portion of the electric wire arranging groove, at least in a part of a segment between the insertion start portion and the bottom portion, wherein the electric wire arranging groove is a composite groove having a V-shaped groove having a V-shape in the section and a concave groove communicating with a bottom portion of the V-shaped groove, the concave groove has a concave shape in which a distance in the width direction in the section is fixed, and wherein, in the vertical direction, the concave groove is shorter than the V-shaped groove; and the ultrasonic bonding apparatus further comprising an electric wire holding structure including: an electric wire holding portion having an electric wire insertion groove configured to receive the electric wires inserted therein; and a movable electric wire pressing portion pressing the electric wires inserted into the electric wire insertion groove toward the bottom portion of the electric wire insertion groove.

\* \* \* \* \*